US008750922B2

(12) United States Patent
Yasrebi et al.

(10) Patent No.: US 8,750,922 B2
(45) Date of Patent: Jun. 10, 2014

(54) PRIORITIZED PROMPT ORDERING AND CALL PROCESSING IN INTERACTIVE VOICE RESPONSE SYSTEMS

(75) Inventors: Mehrad Yasrebi, Austin, TX (US); James Jackson, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1385 days.

(21) Appl. No.: 12/491,428

(22) Filed: Jun. 25, 2009

(65) Prior Publication Data

US 2010/0329435 A1 Dec. 30, 2010

(51) Int. Cl.
| | |
|---|---|
| H04M 1/00 | (2006.01) |
| G06F 15/16 | (2006.01) |
| H04M 3/42 | (2006.01) |
| H04M 3/46 | (2006.01) |
| H04M 3/527 | (2006.01) |

(52) U.S. Cl.
CPC .. H04M 3/42238 (2013.01); H04M 2203/4509 (2013.01); H04M 2203/2044 (2013.01); H04M 3/42102 (2013.01); H04M 2242/22 (2013.01); H04M 3/46 (2013.01); H04M 3/527 (2013.01)
USPC .......................................... 455/551; 709/206

(58) Field of Classification Search
USPC ........ 379/142.06, 210.01; 455/415, 416, 418, 455/456.5, 445, 458, 551; 709/206, 227
See application file for complete search history.

(56) References Cited

U.S. PATENT DOCUMENTS

| | | | |
|---|---|---|---|
| 5,396,264 A | 3/1995 | Falcone et al. | |
| 6,900,835 B2 | 5/2005 | Cazier et al. | |
| 2002/0107008 A1* | 8/2002 | Hendrey et al. | 455/416 |
| 2003/0125072 A1* | 7/2003 | Dent | 455/551 |
| 2004/0100505 A1 | 5/2004 | Cazier | |
| 2005/0119878 A1 | 6/2005 | Haenel et al. | |
| 2005/0206746 A1 | 9/2005 | Cazier et al. | |
| 2006/0212583 A1* | 9/2006 | Beadle et al. | 709/227 |
| 2011/0029622 A1* | 2/2011 | Walker et al. | 709/206 |
| 2011/0034156 A1* | 2/2011 | Gatti et al. | 455/415 |
| 2011/0173282 A1* | 7/2011 | Aaltonen et al. | 709/206 |

* cited by examiner

Primary Examiner — Mohammad Islam
(74) Attorney, Agent, or Firm — Wolff & Samson, PC

(57) ABSTRACT

A system and method for processing a call to a destination associated with multiple group members in a unified messaging system by determining a prioritized order of the group members for presentation to caller and receiving a selection from the caller. The order of the group members can be determined based on call histories, address books, and distribution lists of the calling party and the group members of the destination. A weighted score is computed for each group member, and the group members are sorted based on the weighted scores. The sorted list of group members is then presented to the calling party for selection. Based on the calling party's selection the unified messaging system can further process the call.

15 Claims, 5 Drawing Sheets

PRIORITIZED PROMPT ORDERING AND CALL PROCESSING IN INTERACTIVE VOICE RESPONSE SYSTEMS

BACKGROUND OF THE INVENTION

The present invention relates generally to processing a call in a unified messaging system, and more particularly to determining a prioritized order of group members in a unified messaging system and processing a call based on a selection from the prioritized order of group members.

Unified messaging is the integration of multiple (typically two or more) types of communication (e.g., email, voicemail, short message service (SMS), fax, etc.) into a single, unified message store (e.g., a unified messaging system) accessible from a variety of user devices. Unified messaging is typically provided by a service provider, which may be the same service provider that provides telephone service. In order for a service provider to provide unified messaging service to an organization of subscribers (also called users, which may be employees of a client organization), the unified messaging system may be configured with organizational data regarding related groups in the client organization's organizational structure. Each user can be associated with multiple devices and/or phone numbers. Additionally, each user can be assigned his/her own unified messaging mailbox.

When a user provides a list of contact numbers or is associated with multiple numbers/devices, a unified messaging system can provide find me follow me (FMFM) procedures which increases the chance of establishing a call successfully with the client. When a calling party calls one of the devices of the user, the unified messaging system can concurrently or sequentially attempt to contact each of the client's associated numbers/devices to locate the client.

Frequently, when a primary group mailbox (i.e., main mailbox) is associated with multiple parties, the unified messaging system presents the calling party with the name and/or numbers of each party associated with the primary group mailbox and each of the secondary mailboxes associated with that primary mailbox. For example, when a caller dials any of the numbers of the devices associated with the primary mailbox, and the dialed number is not connected to the user of that device at that time, the caller may be connected to the unified messaging interactive voice response (IVR) of the primary mailbox. A caller may also dial directly into an access number of the unified messaging system and identify the primary mailbox using one of the available mechanisms (e.g., by presenting the telephone number of any devices associated with that primary mailbox in response to the appropriate interactive voice response prompts).

Once the unified messaging system is informed of the addressed primary mailbox, the unified messaging system presents the caller with various choices of mailboxes (primary or secondary) to leave a message in. For example, the unified messaging system may state "to reach or leave a message for John or John's assistant, press 1; to reach or leave a message for Sally, press 2, to reach or leave a message for Cyrus, press 3; to reach or leave a message for Maya, press 4; to reach or leave a message for Sara, press 5." If the calling party is attempting to reach Sara, he/she must wait until the end of the message to learn which number to press to reach Sara. As the number of secondary mailboxes associated with a primary mailbox increases, the wait time for a calling party also increases.

Causing the user to wait for presentation of the desired selection can cause much frustration and a loss of time and productivity. Accordingly, improvements in a unified messaging system are desirable.

BRIEF SUMMARY OF THE INVENTION

The present invention relates generally to processing a call in a unified messaging system, to a destination that is associated with multiple group members. More specifically, the call is processed by determining an order of the group members for presentation to the calling party and processing the call based on a selection from the prioritized order of group members by the calling party.

In accordance with one aspect of the present invention, a unified messaging system receives a call to a destination (e.g., phone number) associated with multiple group members. The unified messaging system identifies the group members associated with the destination and determines an order of the group members based on various data available to the unified messaging system. Each group member is presented to the calling party sequentially based on the determined order of group members until the calling party selects a particular group member. Once the selection is received the call can be further processed, based on the communication, for example by performing a find me follow me group hunt or by connecting the calling party to the selected group member's mailbox.

The order of the group members can be determined in various ways. In accordance with one aspect of the present invention, the unified messaging system determines the identity of the calling party (i.e., the initiator of the call). The unified messaging system can then gather various data including address books, call histories, and distribution lists associated with the caller. Additionally, the unified messaging system can retrieve the address books, call histories, and distribution lists of each group member. For each group member, each data set retrieved by the unified messaging system can be assigned a score. For a particular group member, the data set scores can be assigned a weight and summed to determine a total score. Once each group member has been assigned a score, the group members can be sorted by their respective score, thus determining the order of the group members for presentation.

These and other advantages of the invention will be apparent to those of ordinary skill in the art by reference to the following detailed description and the accompanying drawings.

DETAILED DESCRIPTION

Embodiments of the present invention are directed to a unified messaging (UM) system, in which the unified messaging system can determine an order of menu options based on various accessible data. For example, a destination phone number may be associated with multiple people. When a call made by a calling party to a destination is not answered by a person associated with the destination, the call can be directed to the unified messaging system for processing (e.g., redirected to voicemail). Because the destination is associated with multiple people, the unified messaging system can utilize an interactive voice response (IVR) system to audibly present the people associated with the phone number to the calling party, so that the calling party can select the specific person he/she is trying to call. Traditionally, each person associated with the destination is presented in a predetermined order. However, in the present invention, the unified messaging system can analyze data that is available to it (e.g., the identity of the calling party, the address books of the parties involved, etc.) to predict which person associated with the destination the calling party is likely trying to reach. Based on the prediction, the unified messaging system can order the mailboxes associated with the parties and present each one in accordance with the order. If the unified messaging system accurately predicted the intended called party, the IVR will present the calling party with the intended called party first, or near the beginning of the list, at which point, the calling party can make a selection and bypass listening to the remaining possible selections. Thus, the unified messaging system saves time and maintains the focus of the calling party by attempting to present each person associated with the destination in an order corresponding to the probability each party is the intended recipient of the call.

Figure 1:
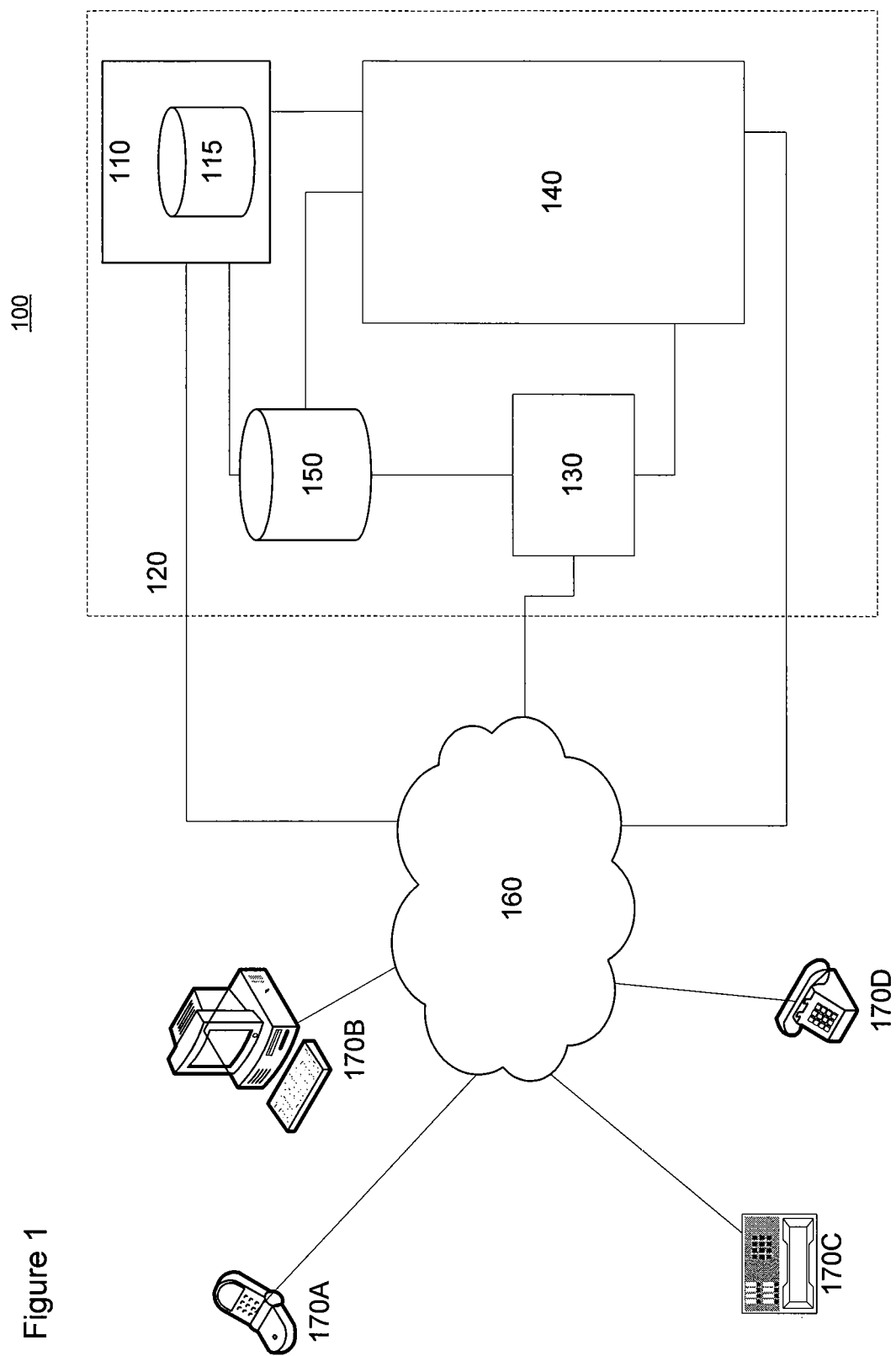
FIG. 1 illustrates a unified messaging environment in accordance with an embodiment of the present invention.

With reference to the figures, FIG. 1 illustrates a unified messaging environment 100 according to an embodiment of the present invention. Unified messaging environment 100 includes a unified messaging system 120 and a controller 110 that includes organizational data corresponding to an organizational structure of a customer (client) of the unified messaging system 120. The unified messaging system 120 includes a server 140, a database 150, and a gateway 130. The gateway 130 interfaces with a network 160, thereby enabling the server 140 to communicate with the controller 110. Various communication devices 170A-170 D are also connected to, and communicate via, the network 160. The server 140 can receive communication attempts (e.g., calls) from a communication device 170A-170D and route those calls using various services to another of the communication devices 170A-170D or for further processing by the unified messaging system 120.

Network 160 can include packet communication networks, public switched telephone networks (PSTNs), wireless networks, wide area networks, local area networks, or others, and may employ various protocols. For example, a packet communications device (e.g., device 170C and/or computer 170B) may communicate via a packet network such as the Internet, an analog device (e.g., device 170D) may communicate via a PSTN, a wireless device (e.g., device 170A) may communicate via a mobile network, and the unified messaging system 120 may communicate with one or more of instances of any wireless network(s), PSTN network(s) and packet network(s). Network 160 may also include private and/or publicly accessible components and/or networks.

The database 150 of the unified messaging system 120 stores data generated by or associated with the unified messaging system 120. For example, the database 150 can store a log (i.e., history) of communications (e.g., calls, short message service (SMS) messages, voicemail, and email) received by the unified messaging system 120, information about the calls such as the calling party, the called party, the status of the call (e.g., answered or un-answered), and which unified messaging services were used during the call.

The controller 110 can interface with database 150 and third party databases, such as the organizational databases 115. The organizational database 115 stores entries corresponding to users associated with the client (e.g., employees, household members, family members). The entries of the organizational database 115 can be logically organized hierarchically according to a hierarchical organizational structure of the client, and include human resources information associated with the users, such as name, telephone number (TN), geographical location, group membership, device specifications, alternate devices that may be used in find me follow me (FMFM) scenarios, etc. Additionally, personalized user information can be stored in the organizational database, such as address books and distribution lists.

Organizational databases are often linked with, used as, or used in conjunction with telephone databases. Thus, while the controller 110 is illustrated separately from the unified messaging system 120, it would be understood by one of ordinary skill in the art that controller 110 could be integrated into the unified messaging system 120. Similarly, the organizational database 115 can be incorporated into, or used in conjunction with database 150. The inclusion of some or all of the services and information provided by controller 110 into the unified messaging system 120 is beneficial for small organizations that do not require their own human resources database, such as small businesses and families. Associations of user devices 170A-170D with users and mailboxes of the unified messaging system 120 are preferably maintained in the database 150.

User devices 170A-170D can include various types of devices. These devices can include a landline telephone 170D that communicates via a public switched telephone network (PSTN), a wireless telephone 170A that communicates via a cellular network, a digital telephone 170C that communicates via voice-over-IP (VoIP), and a computer 170B that provides a software program for placing telephone calls over the Internet. A user can be associated with more than one device. For example, a user may have a digital telephone 170C, a wireless telephone 170A, and a landline telephone 170D. Organizational database 115 can store the association between a particular user and multiple communication devices. Thus, a user's communications can be carried over various networks and can be serviced by various service providers.

Figure 2:
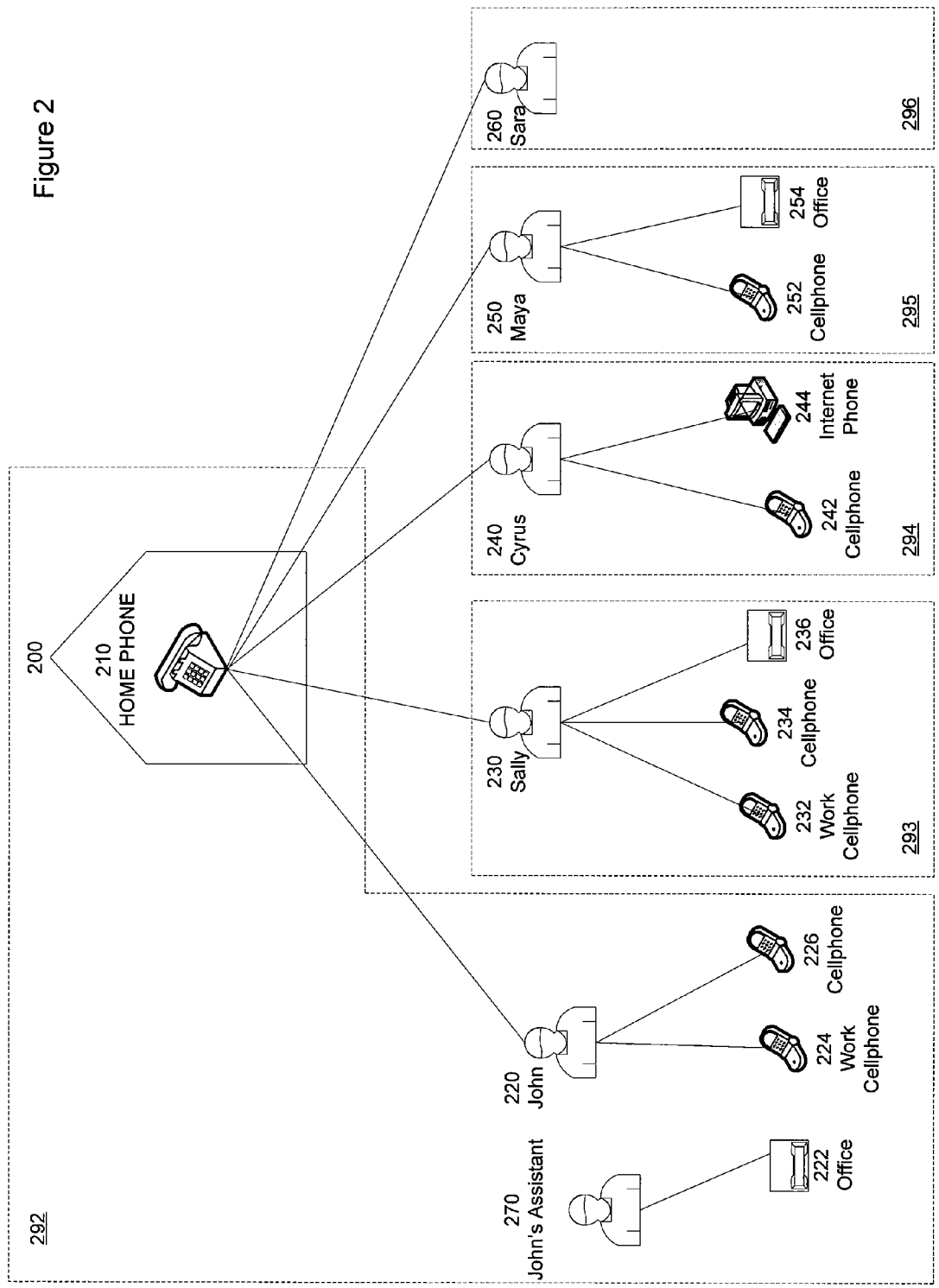
FIG. 2 illustrates a hierarchical organizational structure of a household with which the present invention can operate.

FIG. 2 illustrates a hierarchical organizational structure of a household. The household 200 includes a Home Phone 210, having a phone number that is shared by the house's occupants: John 220, Sally 230, Cyrus 240, Maya 250, and Sara 260. The organizational database 115 and/or the database 150 can store the association between the Home Phone 210 and the occupants. Associations between users, mailboxes, and devices can be stored in whole or in part in database 150 for use by unified messaging system 120, but may also be stored (in full or in part) in database 115. Associations can be stored, for example, in a table in a database, a flat file, or other data structure. Each of the occupants can be associated with a further set of devices and corresponding phone numbers. In the example illustrated in FIG. 2, John 220 is further associated with a wireless telephone 226 and a work wireless telephone 224. Sally is also associated with a wireless telephone 234, a work wireless telephone 232, and a digital telephone 236. Cyrus is associated with a wireless telephone 242 and an internet phone 244. Maya is associated with a wireless telephone 252 and a digital telephone 254. Sara is not associated with any additional user devices. John's Assistant 270 is also associated with John's digital telephone 222.

As illustrated in FIG. 2, primary mailbox 292 is associated with devices Home Phone 210, Office phone 222, work wireless telephone 224, and wireless telephone 226. Primary mailbox 292 is associated with the secondary mailbox 293 for Sally 230, the secondary mailbox 294 for Cyrus 240, the secondary mailbox 295 for Maya 250, and the secondary mailbox 296 for Sara 260. Messages for John 220 and/or John's assistant 270 may be stored in the primary mailbox 292. Messages for Sally 230 may be stored in the secondary mailbox 293. Messages for Cyrus 240 may be stored in the secondary mailbox 294. Messages for Maya 250 may be stored in the secondary mailbox 295. Messages for Sara 260 may be stored in the secondary mailbox 296. After being presented with prompts from the unified messaging system interactive voice response system, a caller selects the mailbox in which he/she desires to leave a message. A caller to the primary mailbox 292 (e.g., by calling the Home Phone 210) may hear a group greeting prompt from the interactive voice response system of unified messaging system 120, and may chose to deposit a message in the primary mailbox 292 or any of the secondary mailboxes 293-296.

Thus, as illustrated in FIG. 2, a user device can be associated with multiple users, for example as shown with respect to Home Phone 210. Additionally a user can be associated with more than one user device, as illustrated for example with respect to Cyrus 240 and wireless telephone 242 and internet phone 244.

The various processes of the present invention are discussed below with respect to the hierarchical organizational structure illustrated in FIG. 2.

Figure 3:
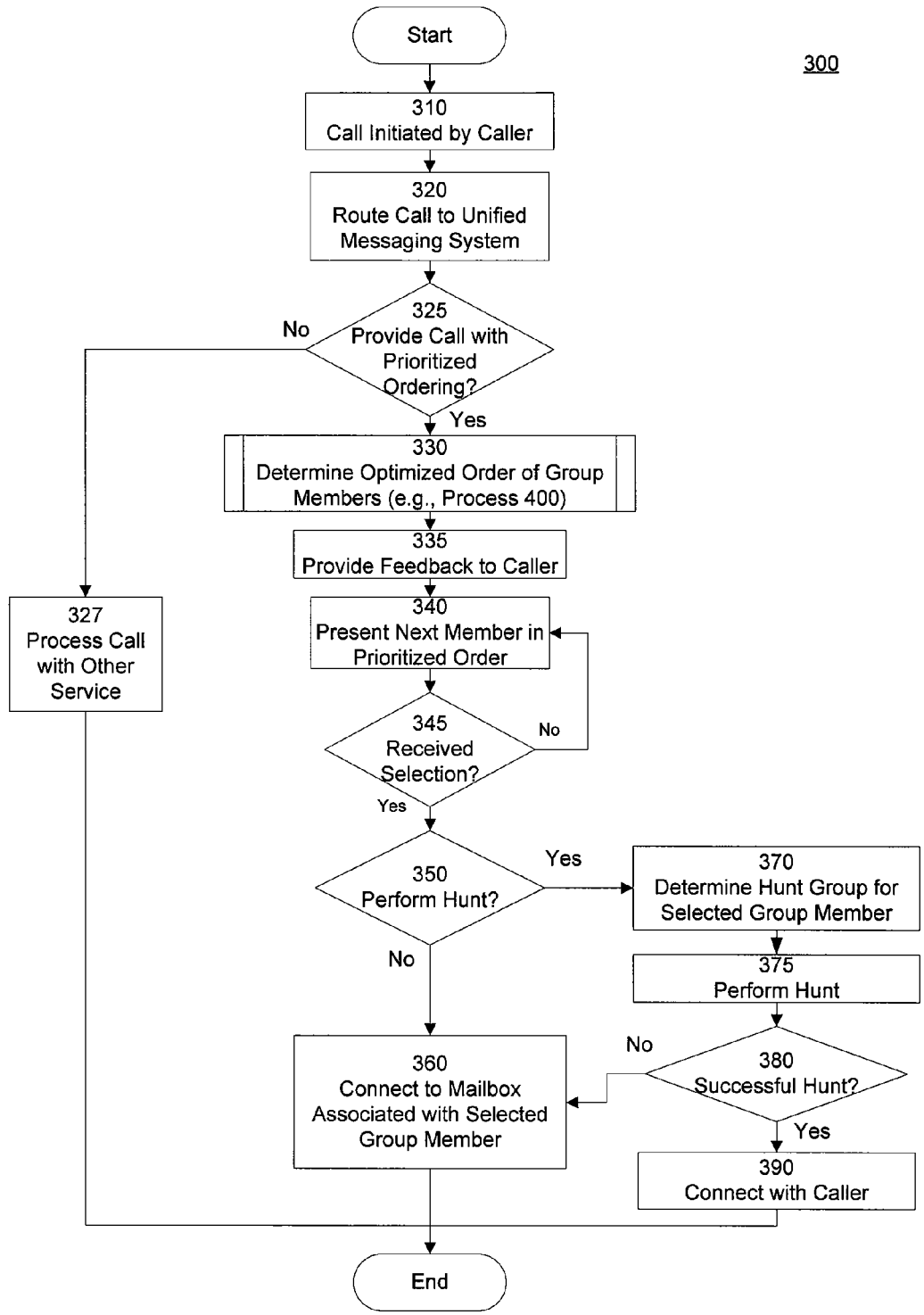
FIG. 3 illustrates a method for processing a communication in accordance with an embodiment of the present invention.

FIG. 3 illustrates a process 300 by which a communication (e.g., telephone call) is processed in accordance with an embodiment of the present invention. At step 310, a call is initiated by a caller to a specified destination (e.g., a phone number). The call is then routed to a unified messaging system 120 at step 320. For example, a calling party may place a call to home phone 210 in an attempt to reach Sally 230. If no party answers the home phone 210, the call is routed to the unified messaging system 120. Alternatively, the calling party can place a call to a phone number that is associated with the unified messaging system, such that the caller is directly connected with an IVR.

The unified messaging system 120 can determine whether the communication should be provided with the prioritized group ordering of the present invention at decision 325. Either, or both, the calling party or the destination can subscribe to the prioritized group ordering service of the unified messaging system 120. The unified messaging system 120 can be configured to provide the prioritized group ordering service based on service subscriptions of the calling party and/or the destination. For example, the unified messaging system 120 can be configured to provide prioritized group order service to any calling party that is subscribed to the service. Alternatively, the unified messaging system 120 can base provisioning of the prioritized group order service on whether the destination is subscribed to the service. In accordance with a further configuration of the unified messaging system, the unified messaging system 120 can require both the calling party and the destination to be subscribed to the service.

If the unified messaging system 120 determines at decision 325 that prioritized group order service should not be provided, the call process by a standard IVR or other service at step 327. However, if the unified messaging system 120 determines prioritized group order service should be provided, the unified messaging system 120 determines the order of the group members at step 330. The process of determining the order of group members is illustrated as process 400 in FIG. 4 and is discussed in detail below. While the unified messaging system 120 is carrying out the prioritization procedure (e.g., the Process 400), the unified messaging system 120 may optionally provide feedback (e.g., an audio recording stating, "please wait while we process your call" or a play some music) to the caller at step 335. This indication that the system 120 is active can be beneficial to inform the caller that he/she is still connected to the system 120 (i.e., the call has not been dropped) particularly, for example, if the system 120 experiences network delays retrieving data or processing the available data requires substantial time.

After the order is determined, the unified messaging system 120 can sequentially present the order to the calling party for selection. At step 340, the unified messaging system 120 presents the next member of the group in the order. If no members of the group order have yet been presented, the next member in the group order at step 340 is the first member of the group order. Otherwise, the next entry in the group order is presented.

In one example, each entry in the group order is presented individually and is associated with a telephone keypad number that can be pressed or the number spoken to indicate selection. For example, the unified messaging system 120 can play (i.e., render or synthesize) the following: "To reach Sally, press or speak 3; to reach John or John's assistant, press or say 1 . . . ." Alternatively, the keypad numbers associated with each mailbox or party are assigned according to the order of the prioritization and irrespective of the non-prioritized group member order (e.g., "To reach Sally, press or speak 1; to reach John or John's assistant, press or say 2 . . . ."). In more sophisticated IVR systems, the unified messaging system 120 can simply render the name of each entry in the group order and ask the calling party to state the name of the party desired. For example, the unified messaging system 120 may render a group greeting "Please state the name of the party you are trying to reach. Would you like to reach Sally, John or John's assistant, Maya, Sara, or Cyrus?"

Users of the unified messaging system 120 having the proper credentials (e.g., PINs and/or passwords) for a particular mailbox may be able to access the contents of that mailbox. For example, if John's assistant 270, John 220, Sally 230, Cyrus 240, Maya 250 and Sara 260 all have the proper credentials, one or any of them may configure the IVR group greeting to indicate that a caller can leave a message for any of them in the (common) primary mailbox (e.g., they could reconfigure the prompt to be "to leave a message for John's assistant, John, Sally, Cyrus, Maya or Sara in the common mailbox, please press or say 1"). Alternatively, and as discussed below, the unified messaging system 120 can be configured such that the common mailbox can be presented as the default option. That is, the unified messaging system 120 can state that calling party will be directed to the common mailbox if no selection is made, and after waiting a predetermined time, connect the calling party to the common mailbox.

The calling party is not required to listen to the rendering of all the entries in the group order. Rather, once the calling party determines the name or number of the party that is desired, the calling party can press or say the associated number (or name). Thus, at decision 345, the unified messaging system 120 determines whether the calling party has made a selection of the specific target mailbox. If no selection has been made, the unified messaging system 120 continues to present the next entry in the group order by returning to step 340. However, if a selection has been made, the unified messaging system 120 proceeds with processing the call.

It should be noted that while steps 340 and 345 are illustrated as a linear progression (i.e., present the next entry in the group order, check for the calling party's selection, and repeat), one of ordinary skill in the would understand that the steps of presenting the entries in the group order and monitoring for the calling party's selection can be performed concurrently. The concurrency is typically provided by an event-driven, multi-threaded or multi-process application. However, any known architecture for providing concurrency and/or multi-tasking can be utilized.

If the last entry in the group order has been presented, and, after an optional predetermined wait time, no selection has been made, the unified messaging system 120 can be configured to proceed in various ways. In one configuration, the unified messaging system 120 can simply repeat the determined order and monitor for a selection. Alternatively, the unified messaging system 120 can connect the calling party with a primary mailbox that may be accessible by some or all the members of the group. In a further alternative, the unified messaging system 120 can repeat the determined group order a predetermined number of times, and, if no selection is made, connect the calling party to the primary mailbox.

In yet a further alternative, the unified messaging system 120 can automatically, or in response to a system prompt, attempt to reach any member of the group, for example by performing a find me follow me (FMFM) procedure for all of the devices associated with a selected target mailbox concurrently. Thus, for example, if a calling party wants to talk to any family member associated with home phone 210, a find me follow me procedure can be performed for device home phone 210, office phone 222, work wireless telephone 224, and wireless telephone 226 to reach either John's assistant 270 or John 220. Unified messaging system 120 would not carry out an FMFM procedure for Sara's secondary mailbox 296, since there are no devices associated with that secondary mailbox 296. As another example, unified messaging system 120 can carry out an FMFM procedure for Cyrus 240 at secondary mailbox 294 for devices wireless telephone 242 and Internet phone 244, if the caller reaches the secondary mailbox 294.

Commonly known FMFM configurations and procedures can be implemented to avoid infinite call loops. For example, a device for which an incoming call arrived into unified messaging system 120 may not be included in an FMFM procedure, the amount of time an FMFM procedure is outstanding for a device may be limited, and/or unified messaging system 120 may disregard calls originating and arriving into unified messaging system 120.

In response to receiving a selection from the user, the unified messaging system 120 can process the call according to a configuration. The configuration can be set based on the destination called (e.g., Home Phone 210) or the group member selected (e.g., Sally 230). Additionally, a hierarchy of configurations can be specified. For example, the unified messaging system 120 can provide a default configuration that can be overridden by a destination configuration (e.g., Home phone 210 configuration) that can be overridden by the group member configuration (e.g., Sally 230 configuration).

In accordance with one possible configuration, the unified messaging system 120 can perform a find me follow me (FMFM) hunt for the user across all devices associated with the selected group member. At decision 350, the unified messaging system 120 determines whether to perform a hunt based on the selection. If the system is configured to perform a hunt, a hunt group is determined for the selected group member at step 370 and the hunt is performed concurrently across the hunt group at step 375. Thus, in the scenario in which the calling party is attempting to reach Sally 230, once the selection is made, the unified messaging system 120 can perform an FMFM hunt across Sally's work wireless telephone 232, wireless telephone 234, and digital telephone 236.

At decision 380, the unified messaging system 120 determines whether the hunt was successful. If successful, the caller is connected with the destination at step 390. However, if the hunt fails, the caller is connected to the mailbox associated with the selected group member at step 360.

In the case of a successful hunt, the calling party may encounter an infinite loop due to being continually redirected between two or more devices. For example, if the calling party is attempting to reach John 220, but John 220 has set his wireless telephone 226 to forward all calls to the home phone 210, the caller will never reach John 220 or John's mailbox, but will be continually redirected to the IVR system at the home phone 210. Such loops can be avoided by tracking to which devices an attempted connection has been made and not attempting the same device twice. Thus, in the example above, once the calling party selects John 220, and the call is routed to John's wireless telephone 226, the unified messaging system 120 will recognize that the call is being forward to the home phone 210, a device to which a connection has already been attempted, and therefore, connect the calling party with John's mailbox as a default operation rather than forwarding the calling party back to the Home Phone 210.

If at decision 350, the unified messaging system 120 is configured not to perform a hunt, but to process the call with another service, the call is routed appropriately. For example, as illustrated in FIG. 3, if a hunt is not performed, the call is connected to the mailbox of the selected group member at step 360.

The foregoing discussion illustrates the integration of a prioritized group ordering service in a unified messaging system 120 can be integrated into a call-processing scenario. The following discussion focuses on the determination of the prioritized group order (e.g., step 330) in the unified messaging system 120 as illustrated in FIG. 4, process 400.

A unified messaging system 120 typically maintains a database, or some other data store, or information about its users, including system generated and user generated information. For example, system generated information can include the history of a user's placed and received phone calls and communications, and information about those calls such as the parties to the call, the time and day of the call, and the duration of the call. User generated information can include user defined distribution lists, and address books. Additionally, because the unified messaging system 120 typically has access to a larger network (e.g., the Internet), the unified messaging system 120 can obtain information from other data sources. For example, if a user has provided the unified messaging system 120 with access information (e.g., username and password) to an electronic mail account, the unified messaging system 120 can access the account and examine any address books and distribution lists. Another source of information may be call records for user devices. Any or all of the information accessible by the unified messaging system 120 can be used to determine an ordering of the group members of a communication destination.

Much of the information gathered by the unified messaging system 120 and used to determine the prioritized group order first requires the determination of the identity of the calling party (i.e., the initiator). Thus, at step 410 the unified messaging system 120 determines the identity of the initiator. At step 420, the unified messaging system 120 determines the identity of the group members associated with the destination of the call.

Figure 4:
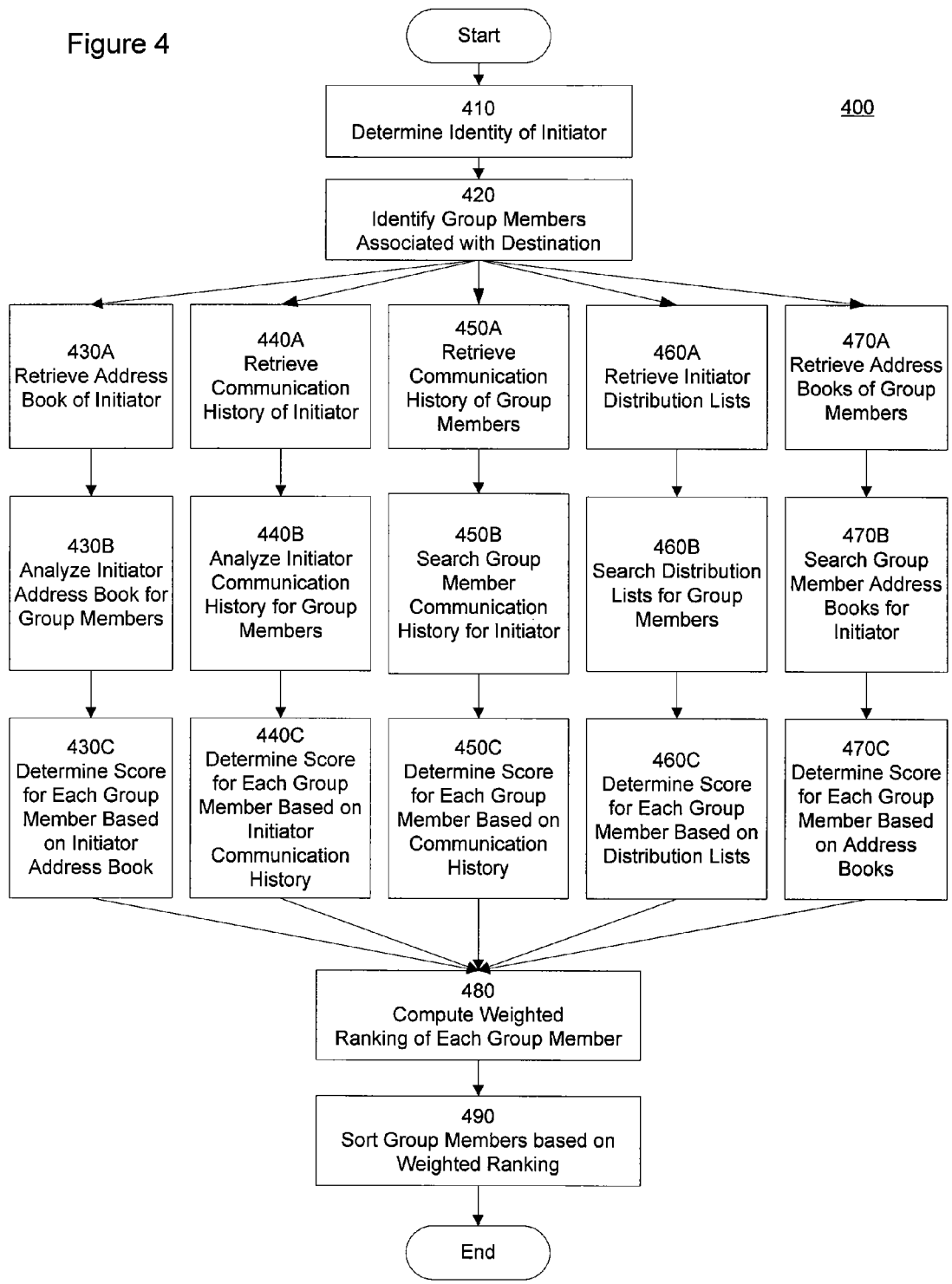
FIG. 4 illustrates a method for determining an order of group of members in accordance with an embodiment of the present invention.

In accordance with process 400 illustrated in FIG. 4, the unified messaging system 120 may utilize five categories of information to determine the order of the group members, as determined by the configuration and/or implementation of the unified messaging system 120 and the information accessible by the unified messaging system 120. Specifically, process 400 may examine the initiator's (caller's) address book 430A-430C, the communication of the history of the initiator 440A-440C, the communication history of the group members 450A-450C, distribution lists of the initiator 460A-460C, and address books of the group members 470A-470C. However, one of ordinary skill in the art would understand that any one or more of the five illustrated categories, in any combination, could be used to determine the prioritized group order. Alternatively, additional categories of information not illustrated in FIG. 4 could be used, for example, the distribution lists of the initiator. However, such information may not be accessible to unified messaging system 120. For example, if the caller (initiator) is not a subscriber of the unified messaging system 120, unified messaging system 120 may not have access to the address book of the caller.

In more specific detail, at step 430A the unified messaging system 120 may retrieve the initiator's address book. The address book can be retrieved from the unified messaging system 120 database or from another database that is accessible by the unified messaging system. At step 430B, the unified messaging system 120 can analyze the initiator's address book to determine whether any of the group members are in the address book. At step 430C, the unified messaging system 120 scores each group member in view of the initiator's address book. In one embodiment, the score is binary. That is, the group member is either present or not. In another embodiment, if specified in the address book, the unified messaging system 120 can examine the relationship of the initiator to each group member in the address book. For example, a family contact may be rated higher than a friend or business contact.

At step 440A, the unified messaging system 120 may retrieve the initiator's communication history. The initiator's communication history can be stored in the database 150 of the unified messaging system. However, if the initiator subscribes to a different unified messaging system 120 service provider, a full record of the initiator's communication history may not be available in the database 150. In this scenario, the unified messaging system 120 can search the available call history, preferably limited to the group members, for communications to which the initiator was party. Alternatively, the unified messaging system 120 can communicate with the service provider(s) of John, Sally, .Etc. (not shown) using an agreed upon protocol to exchange information and access the required databases. For example, the unified messaging system 120 can request the entire call history of the initiator, or request the initiator's call history in which any of the group members was a party.

Once the call history of the initiator is retrieved, the history is analyzed, for example by searching the call history for any communications with the group members. Each group member can then be scored at step 440C based on various factors, such as the number of calls made to a particular group member, the length of the calls, and/or the trend in frequency of calls to a particular group member (e.g., the initiator may have called Cyrus 240 twenty times in total, of which two times were in the previous month, but the initiator may have called Maya 250 ten times, all ten of which were in the previous week, thus giving Maya a higher score). Additionally, a particular group member may be assigned a higher score if the initiator of the call was frequently the previous initiator of the call, rather than the called party. Furthermore, previous communications can be weighted in view of the time and day of the call. For example, if a call is made on a Sunday at noon, other calls to group members on Sunday around noon may be assigned a higher score. Each variable for analysis can be scored individually and combined, optionally in a weighted average, to determine the score for a particular group member based on the initiator's call history.

Examination of the communication history of the group members can be redundant in view of the examination of the initiators call history. However, this examination can be beneficial, for example if the initiator's communication history is not accessible to the unified messaging system 120 because the initiator subscribes to a difference service provider than that of the group members. Therefore, as discussed with respect to step 440A-440C, at step 450A, the unified messaging system 120 may retrieve the communication history of the group members. At step 450B, the communication history is analyzed at step 440B, and scored at step 450C as discussed with respect to step 440C.

At steps 460A-460C, the unified messaging system 120 can examine the distribution lists of the initiator, if such information is available to it. Specifically, at step 460, the unified messaging system 120 retrieves the initiator's distribution lists. If the initiator is not a subscriber to this particular service, the unified messaging system 120 can communicate with the initiator's subscribed unified messaging system 120 or other service provider(s) of the initiator and/or distribution lists of initiator (not shown) as discussed with respect to step 440A. At step 460B, the unified messaging system 120 searches the retrieved distribution lists for group members, and at step 460C each group member is scored based on the analysis of the distribution lists. The score can be binary or a step function (i.e., either the group member is in a distribution list or not). Alternatively, the score can be based on the number of distribution lists identify each particular group member. That is, if the initiator has multiple distribution lists, a group member that is identified on multiple distribution lists can be assigned a higher score than a group member that is identified on only one distribution list.

As similarly discussed with respected to steps 430A-430C, the unified messaging system 120 can examine the address books of the group members to assist in determining the order of the group members. Thus, at step 470A, the various address books of each group member can be retrieved, and analyzed at step 470B (e.g., searched for the initiator). At step 470C, a score is assigned for each group member based on the analysis of the address books.

At step 480, a score is computed for each group member. Optionally the score can be computed by weighting each of the individual variables (i.e., initiator address book, initiator communication history, group member communication history, initiator distribution lists, group member address books, etc . . . ). For example, an algorithm that considers the initiator's address book, distribution list and call history may determine a total score for each group member as follows. If the particular group member is in any address book, the address book score is assigned a binary value of 1, otherwise the score is 0. If the particular group member is in any of the initiator's distribution lists, the distribution list score is assigned a binary value of 1, otherwise the score is 0. For each time a particular group member is found in the initiator's call history, that particular group member's call history score is increased by one (e.g., if the initiator called Sara 260 fifteen times, Sara's call history score is fifteen). To determine the total score for each group member, the address book score is assigned a weight of 30, the distribution list score is assigned a weight of 20, and the call history score is assigned a weight of 50. The individual variables are multiplied by their assigned weight and summed to determine the total score for each group member.

Once the scores for each group member are computed, the unified messaging system 120 can sort the group members at step 490. Thus, as discussed with respect to step 330 of process 300, the order of the group members is determined, and the sorted order of the group members can be sequentially presented to the initiator of the call at steps 340 and 345.

While the above discussion illustrates the processes of the present invention in connection with a group of people, one of ordinary skill in the art would understand that the invention can be broadly used in an IVR menu system. That is, an IVR menu that presents a list of instructions as options to a calling party can use the processes of the present invention to prioritize the order of the instructions. For example, when a calling party connects to the telephone number of a bank, the calling party can be presented with a list of instructions identifying the options available, including: listening to a checking account balance, listening to a savings account balance, listening to the most recent transactions, connecting to an operator, etc. The system can examine the identity of the calling party, the history of the calling party's communications, including which options have been previously selected, and other available information to determine a relative ranking of the available options. For example, based on the information available to the system, it can be determined that the calling party does not have a savings account and therefore assign a low score to the option of listening to a savings account balance. Additionally, the system may determine that the calling party frequently listens to his/her checking account balance, thus corresponding to an assignment of a high score. In a further example, the destination can store in its records and indication that a service transaction with a particular person was previously interrupted. Based on this indication, the system can assign a high score to the option of connecting with that service. As discussed above, the available information can be analyzed, scored, and weighted to determine an order of the options (i.e., a relative ranking).

Figure 5:
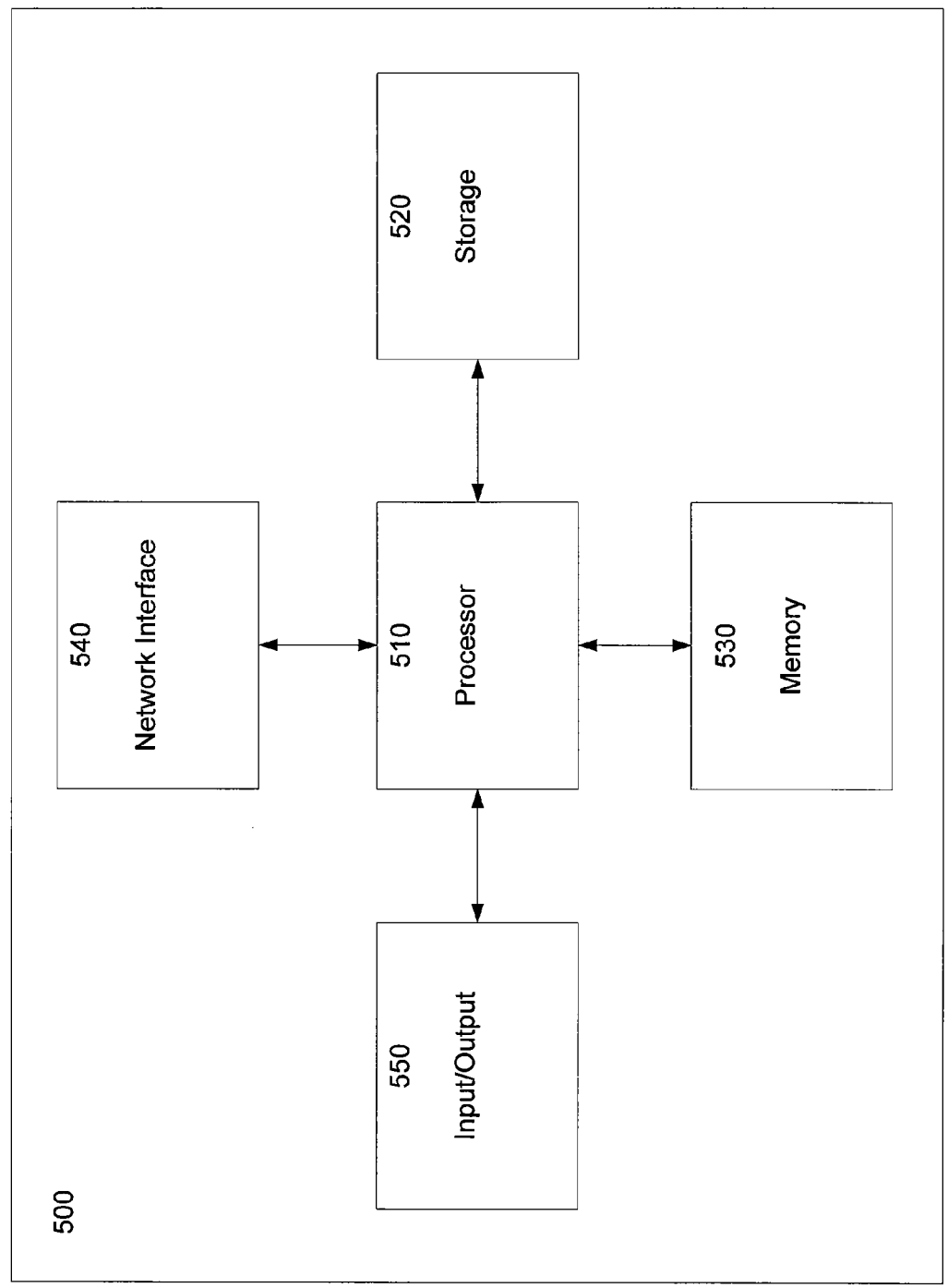
FIG. 5 is a high level block diagram of a computer capable of implementing the present invention.

The above-described methods for processing a call to a destination associated with multiple group members in a unified messaging system 120 can be implemented on a computer using well-known computer processors, memory units, storage devices, computer software, and other components. A high-level block diagram of such a computer is illustrated in FIG. 5. Computer 500 contains a processor 510 which controls the overall operation of the computer 500 by executing computer program instructions which define such operations. The computer program instructions may be stored in a storage device 520, or other computer readable medium (e.g., magnetic disk, CD ROM, etc.), and loaded into memory 530 when execution of the computer program instructions is desired. Thus, the method steps of FIGS. 3 and 4 can be defined by the computer program instructions stored in the memory 530 and/or storage 520 and controlled by the processor 510 executing the computer program instructions. For example, the computer program instructions can be implemented as computer executable code programmed by one skilled in the art to perform an algorithm defined by the method steps of FIGS. 3 and 4. Accordingly, by executing the computer program instructions, the processor 510 executes an algorithm defined by the method steps of FIGS. 3 and 4. The computer 500 also includes one or more network interfaces 540 for communicating with other devices via a network. The computer 500 also includes input/output devices 550 that enable user interaction with the computer 500 (e.g., display, keyboard, mouse, speakers, buttons, etc.) One skilled in the art will recognize that an implementation of an actual computer could contain other components as well, and that FIG. 5 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention. The various functional modules that are shown are for illustrative purposes only, and may be combined, rearranged and/or otherwise modified.

We claim:

1. A method comprising:
   receiving a call from a caller to a number associated with a plurality of group members;
   identifying the plurality of group members associated with the number;
   determining an order of the plurality of group members;
   sequentially presenting the plurality of group members in accordance with the order for selection by the caller, until a selection of a particular group member is received;
   receiving the selection from the caller;
   processing the call based on the selection;
   determining an identity of the caller, wherein the determining the order of the plurality of group members is based on the identity of the caller;
   retrieving a call history associated with the caller;
   retrieving an address book of one of the plurality of group members;
   retrieving a distribution list associated with the one of the plurality of group members;
   comparing the identity of the caller to the address book of one of the plurality of group members;
   comparing the identity of the caller to the distribution list of the one of the plurality of group members; and
   analyzing the call history associated with the caller;
   wherein the order of the plurality of group members is based on a weighted evaluation of a comparison of the identity of the caller to the address book, a comparison of the identity of the caller to the distribution list, and a analysis of the call history of the caller.

2. The method of claim 1, further comprising:
   retrieving a call history associated with the caller; and
   comparing the plurality of group members to the call history associated with the caller,
   wherein the determining the order of the plurality of group members is based on a result of the comparison.

3. The method of claim 1, further comprising:
   retrieving an address book of the caller; and
   comparing the plurality of group members to the address book of the caller,
   wherein the determining the order of the plurality of group members is based on a result of the comparison.

4. The method of claim 1, wherein the processing the call based on the selection includes connecting the caller to a mailbox associated with the selected group member.

5. The method of claim 1, further comprising:
determining a hunt group associated with the particular group member selected, wherein the processing the call based on the selection includes hunting for the selected group member based on the hunt group.

6. The method of claim 5, wherein the processing the call based on the selection includes connecting the caller to a mailbox associated with the selected group member, in response to an unsuccessful hunt.

7. The method of claim 5, wherein the hunt is performed concurrently across the hunt group.

8. The method of claim 1, wherein the call is received at a unified messaging service.

9. A system for providing call forwarding comprising:
a processor; and
a memory to store computer program instructions, the computer program instructions when executed on the processor cause the processor to perform operations comprising:
receiving a call from a caller for a number associated with a plurality of group members;
identifying a plurality of group members associated with the called number;
determining an order of the plurality of group members;
sequentially presenting the order of the plurality of group members for selection by the caller, until a selection of a particular group member is received;
receiving the selection of a selected group member from the caller;
processing the call based on the selection;
determining an identity of the caller, wherein the determining the order of the plurality of group members determines the order based on the identity of the caller;
retrieving a call history associated with the caller;
retrieving an address book of one of the plurality of group members;
retrieving a distribution list of one of the plurality of group members;
comparing the identity of the caller to the address book of one of the plurality of group members;
comparing the identity of the caller to the distribution list of the one of the plurality of group members; and
comparing the plurality of the group members to the call history associated with the caller,
wherein the determining an order computes a weighted evaluation of a result of the comparing the identity of the caller to the address book of one of the plurality of group members, a result of the comparing the identity of the caller to the distribution list of the one of the plurality of group members, and a result of the comparing the plurality of the group members to the call history associated with the caller, and determines the order of the plurality of group members based on the weighted evaluation.

10. The system of claim 9, the operations further comprising:
retrieving a call history associated with the caller,
wherein the determining the order of the plurality of group members determines the order based on the call history.

11. The system of claim 9, the operations further comprising:
retrieving an address book of the caller,
wherein the determining the order of the plurality of group members compares the plurality of group members to the address book of the caller and determines the order based on a result of the comparison.

12. The system of claim 9, wherein the processing the call connects the caller to a mailbox associated with the selected group member.

13. The system of claim 9, the operations further comprising:
determining hunt group associated with the selected group member; and
conducting a hunt for the selected group member based on the hunt group,
wherein the processing the call processes the call based on a result of the conducting the hunt.

14. The system of claim 13, wherein the processing the call connects the caller to a mailbox associated with the selected group member, in response to an unsuccessful hunt.

15. The system of claim 13, wherein the hunt is performed concurrently across the hunt group.

* * * * *